United States Patent

[11] 3,627,236

[72] Inventor Richard F. Hess
Scottsdale, Ariz.
[21] Appl. No. 51,085
[22] Filed June 30, 1970
[45] Patented Dec. 14, 1971
[73] Assignee Sperry Rand Corporation

[54] AUTOMATIC THROTTLE CONTROL WITH AIRSPEED ANTICIPATION
6 Claims, 2 Drawing Figs.
[52] U.S. Cl............................................ 244/77 D, 318/618
[51] Int. Cl............................................ B64c 13/18
[50] Field of Search........................... 244/77 R, 77 D; 318/565, 616, 617, 618

[56] References Cited
UNITED STATES PATENTS

| | | | |
|---|---|---|---|
| 2,933,268 | 4/1960 | Jude et al.................... | 244/77 |
| 2,948,496 | 8/1960 | Joline.......................... | 244/77 |
| 3,362,661 | 1/1968 | Booth et al................. | 244/77 |

*Primary Examiner*—Milton Buchler
*Assistant Examiner*—Jeffrey L. Forman
*Attorney*—S. C. Yeaton ABSTRACT: Automatic throttle control servomechanism for aircraft of the type employing an integrator for the derivation of throttle position feedback from throttle rate wherein during large changes in airspeed reference commands or during large changes in airspeed reference commands and aircraft flap configurations, an airspeed anticipation bias is introduced into a feedback loop around the integrator in order to effectively increase the initial throttle position reference and thereby prevent undershoots of the commanded reference airspeed.

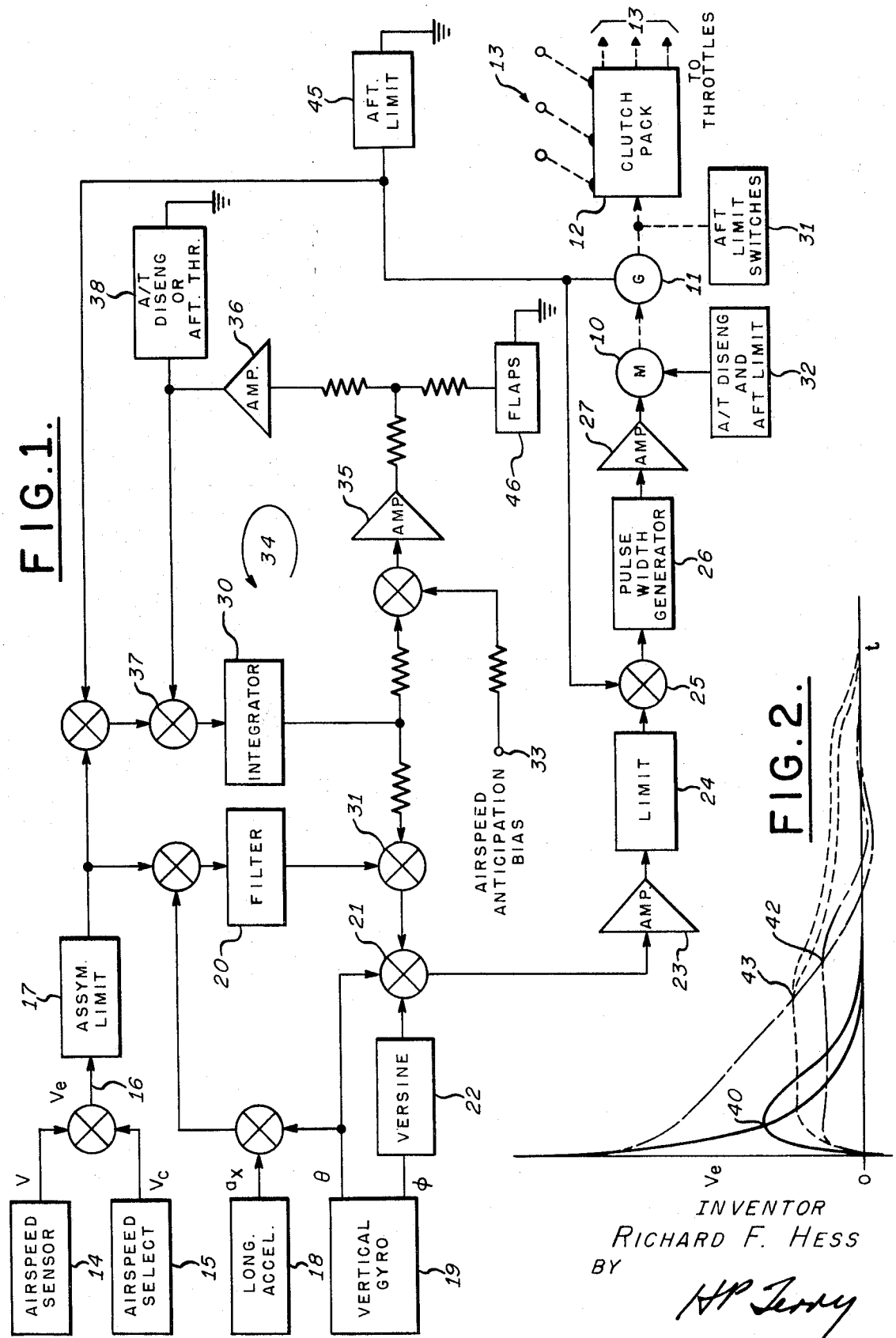

AUTOMATIC THROTTLE CONTROL WITH AIRSPEED ANTICIPATION

BACKGROUND OF THE INVENTION

The present invention relates generally to automatic throttle control systems for aircraft and more particularly to automatic throttle controls of the type wherein the error between the actual airspeed and a reference or desired airspeed controls a servomotor which positions the aircraft throttles to reduce the error to zero. Servo displacement and rate feedback stabilize the system. However, due to the fact that the throttle does not have any positive airframe reference position for zero airspeed error, conventional servo position cannot be used. Thus, as disclosed in applicant's assignee's U.S. Pat. Nos. 2,626,767 to Bromley throttle position feedback is derived by integrating, through a relatively long time constant integrator, the rat of motion of the servo. This technique has proved very successful, particularly with reciprocating-type engines. However, with jet engines, it is desirable, in normal throttle operation, especially during letdown from cruise altitude and on a glide-slope approach to a landing, to limit the low thrust condition to a predetermined value. The reason for such low or retard throttle limit it to prevent the possibility of a prohibitively long delay before the engines can deliver sufficient thrust to recover from a high deceleration condition. The low or retard limits are usually established by electrical switches on the throttle sectors, these switches controlling interlocks which render the throttle servo ineffective therebelow. It should be noted, however, that upon the flare of the aircraft at landing, it is desired to effectively bypass those limits so that the engines may be retarded all the way back to hard stops corresponding to idle thrust position of the throttles.

The retard limits, of course, render the servosystem nonlinear and the effect of this on an automatic throttle system using the integral of throttle rate as a position feedback to introduce an undesirable lag in the system. The result of this loss of reference is to produce undesirable under shoots of the reference or zero airspeed error.

If flaps are lowered during an airspeed capture, the throttle position reference is insufficient, since it was derived from the initial throttle position required for the previous (lower) flap setting and a magnification of undershoot characteristics is the result. Additionally, some automatic throttle systems employ forward loop integral control to remove any possibility of a steady state airspeed error and in some cases the integrator used for integrating throttle rate is also used for the forward loop integrator. This poses the additional problem of upsetting the system position feedback term so that it is not truly proportional to the integral of throttle rate.

SUMMARY OF THE INVENTION

The apparatus of the present invention overcomes these shortcomings of prior automatic throttle control systems of this type. When a large reduction in the reference airspeed is commanded, such as at the initiation of letdown from cruise or on the initiation of a landing glide, it is very likely that the low throttle limits will be reached, introducing a nonlinearity into the system by not allowing the position signal to continue to respond to the airspeed error. This results in a delay in the advance of the throttle servo as zero airspeed is approached and produces an undesirable undershoot of the zero airspeed error condition.

According to the teachings of the present invention, when the aft throttle limits are reached, a predetermined fixed bias signal is applied in a feedback loop around the throttle rate integrator which effectively adds a signal into the output of the integrator. The resultant output of the integrator is therefore higher than it otherwise would be and serves to anticipate the throttle advance with sufficient thrust to bring the airspeed error smoothly to zero without undershooting the zero airspeed error throttle position. By decreasing the synchronization time of the loop and increasing the bias magnitude, an additional or increased bias may also be applied in the same manner when the flaps are lowered below a predetermined amount, such as when on final approach.

DESCRIPTION OF THE FIGURES

FIG. 1 is a block diagram of an automatic throttle control system illustrating a preferred embodiment of the present invention; and FIG. 2 is a graph of airspeed error vs. time useful in understanding the principle of the present invention.

DESCRIPTION OF A PREFERRED EMBODIMENT

Referring now to FIG. 1, there is illustrated in simplified schematic form a typical automatic throttle control system for aircraft. The basic components for the system include a throttle servomotor 10 and tachometer 11 of conventional construction but, in a dual monitored system, may be of the type shown in applicant's assignee's U.S. Pat. No. 3,504,248 to H. Miller. The mechanical output of motor 10 is geared into a suitable throttle clutch pack 12 of conventional construction which is of the type which allows individual manual adjustment of the aircraft throttles 13 through levers 12 and then ganged adjustment thereof through servo 10. A preferred throttle clutch arrangement may be of the type shown in applicant's assignee's U.S. Pat. No. 3,504,912.

Servomotor 10 is driven in accordance with an airspeed error signal derived from a conventional airspeed sensor 14 supplying a signal V proportional the actual airspeed and a conventional airspeed selector 15 which may comprise a panel-mounted airspeed meter driven by sensor 14 and which may incorporate an airspeed select pointer or bug. The bug is manually positioned by the pilot to the commanded airspeed $V_c$ he wished to fly. The difference between the commanded and actual airspeed is, of course, the airspeed error $V_e$ supplied on lead 16. It is conventional practice to limit the magnitudes of the airspeed error and in many cases for flight safety purposes, asymmetrically, that is, to provide an advance-fast/retard-slow capability. This is provided by asymmetric limiter 17.

Inertial airspeed damping relative to the ground plane is provided in a conventional manner by means of longitudinal accelerometer 18 and vertical gyro 19. This is especially important during the approach of the aircraft to a landing, where precise airspeed control is critical. Thus, horizontal acceleration is provided and combined with airspeed error from limiter 17 in a complementary filter 20. In addition, it is often desirable to anticipate changes in airspeed due to changes in the pitch attitude of the aircraft. This is provided by gyro 19 through the same pitch pickup which supplied the compensating signal to accelerometer 18. The pitch anticipation characteristic is described in applicant's assignee's U.S. Pat. No. 2,888,219 to Beers, et al. A further compensating signal is provided during banked turns were additional throttle anticipation may be required to maintain the reference airspeed. This further signal is proportional to the versine of the bank angle and is supplied by vertical gyro 19 and versine computer 22 and combined with the other inputs at junction 21. The resultant error signal is supplied to a suitable amplifier 23, limiter 24 and summing junction 25. At this point, throttle rate is inserted from tachometer 11 for further damping the loop, particularly the servomotor 10. In the embodiment illustrated, the resultant error signal to the servomotor is converted to a pulse width signal by conventional pulse width generator 26, the output of which drives, after amplification in amplifier 27, the throttle servomotor 10.

In order to compensate for long-term throttle trim errors, conventional forward loop integral control is included. This control is provided by a conventional electronic integrator 30 responsive to the airspeed error signal from limiter 17, the output of which is summed with the direct error signal at summing junction 31. This integral term compensates for such long term effects as changes in angle of attack resulting from fuel burn-off and the pitch trim conditions of the aircraft.

In accordance with the teachings of the above-mentioned Bromley patent, position feedback for closing the throttle servo inner loop is provided by integrating the throttle rate. For this purpose, the output of the rate generator 11 is fed back to the input of integrator 30. The integrator may have a relatively long time constant, say about 600 seconds so that for normal throttle activity, the integrator provides an accurate position feedback signal. This feedback signal is supplied to summing junction 31 in opposition to the airspeed error input signal.

As mentioned earlier, it is desired to limit the aft position of the throttles of jet engines to insure resumption of adequate thrust if necessary. These aft limits are set above the idle thrust stops; the later stops are only used after flare is initiated. It will be understood that suitable interlocks are provided for bypassing the aft thrust limit switches when flare is initiated.

The aft limit switches may be any suitable type of switching device and are schematically illustrated herein by block 31. These switches control suitable interlock switches 32 associated with servomotor 10 (and/or amplifier 27, generator 26, etc. whereby when switches 31 are activated by the throttle being driven to its aft limit by servo 10 switch 32 deenergizes the servo 10 or otherwise renders it ineffective to drive the throttles 13.

In accordance with the teachings of the present invention, an airspeed anticipation bias is provide for compensating for the nonlinear conditions existing under those cases where large airspeed errors cause the throttles to move to their aft limit and stop the throttle servo 10 and hence also the throttle rate generator 11.

When this condition occurs, the throttle movement is clamped (no longer responds to the airspeed error) and the integrator is placed in hold (all sensor inputs are removed). The position information stored on the tachometer integrator is integrated throttle rate and airspeed error (which is in the opposite polarity of throttle rate).

The delay involved, before the throttles come out of the limit and respond to the system command, the integrated airspeed, and a finite integrator time constant (the position information will decay while the integrator is in hold) all combine to produce a tendency for the system to undershoot the reference airspeed. Additionally, a long-term washout around the acceleration term (the acceleration term provides system damping when capturing an airspeed reference) also lessens the possibility for an overdamped capture (not undershoot) of the reference airspeed.

The airspeed anticipation term of the present system is supplied by a bias signal 33 of a predetermined magnitude that is connected in a feedback path 34 around integrator 30 and is coupled into the input of the integrator 30 through summing junction 37. The gain of this signal is accurately controlled by the loop gain and summing junction gain. This airspeed anticipation bias signal is rendered effective when the throttle aft limit position is reached, detected by limit switches 31. Interlock connections are made from limit switches 31 to switch 38 which allows the bias signal to be applied to junction 37. The switch 38 which allows the bias signal to be applied to junction 37. The switch 38 is preferably a transistor shunt switch which when energized shunts the bias to ground and when unenergized allows the bias to pass. Thus aft limit switch 31 when activated serves to deenergize switch 38.

The airspeed anticipation bias thus provides an input signal to integrator 30, that serves to increase the throttle position reference, even though the tach generator signal is zero and the integrator, therefore, supplies a position feedback reference for the system even through the throttle servo is stopped. The effect of this bias will become apparent from the following, reference being made now to FIG. 2.

Ideally, if the system remained linear, the position feedback signal from integrator 30 would at some design point 40 equal the airspeed error signal 41 and the servo 10 would reverse and cause the throttles to be so adjusted as to produce a substantially dead beat approach to the zero airspeed error conditions as illustrated by the dot-dash curve. However, when the aft throttle limits are reached, the system becomes nonlinear and without the airspeed anticipation bias of the present invention, the integrator 30 output is fixed by an amount dependent upon the displacement of the servo 10. Thus, the input to the servo amplifiers 26–27 will not be reversed until the airspeed error has reduced to the value of the output of the integrator 30. Because the throttles are not allowed to continue to respond to airspeed error and the integrator output is less than it should be, when the input to the servo is finally reversed, at point 42, to drive the throttles away from its limits, it is too late and the zero airspeed error considerably undershoots as represented by the solid curve of FIG. 2.

With the addition of the bias 33, the point of servo input reversal is anticipated i.e., significantly advanced, as illustrated at 43 and effectively raises the zero airspeed error and thereby prevents undershooting of the actual zero error as illustrated by the dotted curve. Normal forward loop integral control will thereafter allow the throttles to settle out at the true zero airspeed error point.

At this point, it should be pointed out that, when the throttles reach their aft limits, and the motor 10 and generator 11 are stopped, a transistor shunt switch 45 is energized to effectively ground the tach output. While not necessary from a theoretical point of view, it may in practice be desired in order to prevent any "noise" in the generator or its circuits from entering the integrator 30.

As is well known, when the flaps of an aircraft are lowered beyond a predetermined point, as when on final approach for example, the aerodynamic drag on the aircraft is substantially increased and to maintain the airspeed, the throttles are increased. This is also accomplished when the throttles are at the aft limits, by means of the present invention through the inclusion of a further switch means 46 deactivated when the flaps have been extended beyond a predetermined position. Switch 46 may also be a transistor shunt switch which when energized lowers the loop gain. The effect of deactivating switch 46 is, of course, to increase the loop gain, to reduce the synchronization time of the bias on integrator 30 and thus increase its output which in turn effectively allows the throttles to come forward from the aft limits to the higher setting required by the new flap setting.

While the invention has been described in its preferred embodiment, it is to be understood that the words which have been used are words of description rather than limitation and that changes within the purview of the appended claims may be made without departing from the true scope and spirit of the invention in its broader aspects.

I claim:

1. A servomotor system for controlling a condition to approach and maintain a reference condition comprising
    a. a servomotor for controlling said condition
    b. means for supplying an error signal corresponding to the difference between the actual value of the condition and a desired reference value thereof,
    c. means coupled with said servomotor for supplying a signal corresponding to the rate of motion of said servomotor,
    d. integrator means responsive to said rate signal for integrating said rate signal to thereby provide a feedback signal proportional to the position of said servomotor,
    e. means combining said error and position feedback signal in opposition and for supplying the resultant thereof to said servomotor, whereby said servomotor drives said error signal toward null,
    f. means for limiting the position of said servomotor to some predetermined value whereby to reduce the value of said position feedback signal, and
    g. means responsive to said limiting means for supplying a bias signal to said integrator means for compensating for the reduction in the value of said position feedback signal and thereby prevent undershoot of said servomotor in reducing said error signal to zero.

2. An automatic throttle control system for aircraft comprising, a. servomotor means connected to actuate the throttles of the aircraft for controlling the craft airspeed,
b. airspeed reference means for providing an airspeed error signal corresponding to the difference between the actual and desired airspeed of the craft,
c. means responsive to the rate of motion of said servomotor means for supplying s signal in accordance therewith,
d. integrating means responsive to said rate signal for supplying a position feedback signal,
e. said servomotor being controlled by the algebraic sum of said airspeed error and feedback signals to reduce said airspeed error signal to zero.
f. means for limiting the motion of said servomotor means, and
g. means responsive to said limiting means for supplying a bias signal to said integrator means whereby to compensate for the effect of said limiting means on said servomotor in reducing said error signal to zero.

3. The apparatus as set forth in claim 2 wherein said limiting means comprises a limit switch means operable when said servomotor actuates said throttles to a predetermined low value and means responsive to said limit switch means for interrupting the operation of said servomotor.

4. The apparatus as set forth in claim 3 wherein said means responsive to said limiting means comprises a bias signal circuit adapted to be connected in feedback fashion around said integrator means and further switch means responsive to said limit switch means for connecting said bias circuit to the input of said integrator means.

5. The apparatus as set forth in claim 4 wherein said aircraft includes extendable flaps, and further including switch means actuated upon extension of said flaps beyond a predetermined amount for modifying the value of said bias signal.

6. The apparatus as set forth in claim 2 further including means for also supplying said airspeed error signal to the input of said integrator means whereby to provide forward loop integral control of said servomotor.

* * * * *